(12) United States Patent
He et al.

(10) Patent No.: US 11,871,072 B2
(45) Date of Patent: Jan. 9, 2024

(54) VIDEO PROCESSING METHOD AND APPARATUS, AND DEVICE AND STORAGE MEDIUM

(71) Applicant: BEIJING ZITIAO NETWORK TECHNOLOGY CO., LTD., Beijing (CN)

(72) Inventors: Yan He, Beijing (CN); Zhiyuan Tan, Beijing (CN); Hanxin Mai, Beijing (CN); Shaozu Yu, Beijing (CN); Kun Cao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/322,221

(22) Filed: May 23, 2023

(65) Prior Publication Data

US 2023/0308710 A1 Sep. 28, 2023

Related U.S. Application Data

(63) Continuation of application No. PCT/CN2021/131772, filed on Nov. 19, 2021.

(30) Foreign Application Priority Data

Nov. 24, 2020 (CN) .......................... 202011329694.5

(51) Int. Cl.
*H04N 21/431* (2011.01)
*H04N 21/472* (2011.01)

(52) U.S. Cl.
CPC ... *H04N 21/4316* (2013.01); *H04N 21/47205* (2013.01)

(58) Field of Classification Search
CPC ..................... H04N 21/4316; H04N 21/47205
See application file for complete search history.

(56) References Cited

U.S. PATENT DOCUMENTS

| 5,668,639 A    | * | 9/1997 | Martin  | G11B 27/34  |
|----------------|---|--------|---------|-------------|
|                |   |        |         | 360/13      |
| 2010/0042682 A1| * | 2/2010 | Kaye    | H04N 21/4788|
|                |   |        |         | 709/203     |

(Continued)

FOREIGN PATENT DOCUMENTS

| CN | 102842325 A | 12/2012 |
| CN | 106937021 A | 7/2017  |

(Continued)

OTHER PUBLICATIONS

International Search Report and Written Opinion; International Patent Application No. PCT/CN2021/131772, with English translation of Search Report (13 pages).

*Primary Examiner* — Thai Q Tran
*Assistant Examiner* — Jose M Mesa
(74) *Attorney, Agent, or Firm* — Hamre, Schumann, Mueller & Larson, P.C.

(57) ABSTRACT

Provided are a video processing method and apparatus, and a device and a storage medium. The method comprises: when it is detected that an editing reference track of a video to be processed moves out of a video editing window, displaying a mask in a bottom region of the video editing window, wherein the editing reference track comprises a video track and/or an audio track; and then, on the basis of a time axis on the video editing window, displaying, on the mask, the editing reference track of said video, wherein the editing reference track displayed on the mask is used for assisting a user with editing said video in the video editing window.

20 Claims, 3 Drawing Sheets

On detecting that an editing reference track of a to-be-processed video moves out of a video editing window, a mask layer is displayed at a bottom area of the video editing window; the editing reference track includes a video track and/or an audio track — S101

Based on a timeline on the video editing window, the editing reference track of the to-be-processed video is displayed on the mask layer; where the editing reference track displayed on the mask layer is configured to assist a user to edit the to-be-processed video in the video editing window — S102

(56) References Cited

U.S. PATENT DOCUMENTS

| | | | |
|---|---|---|---|
| 2012/0030182 A1* | 2/2012 | Claman | ............... G11B 27/105 707/690 |
| 2014/0219636 A1 | 8/2014 | Shah | |
| 2023/0122589 A1 | 4/2023 | Zheng et al. | |

FOREIGN PATENT DOCUMENTS

| | | |
|---|---|---|
| CN | 110602562 A | 12/2019 |
| CN | 110971957 A | 4/2020 |
| CN | 111757013 A | 10/2020 |
| CN | 112468864 A | 3/2021 |

* cited by examiner

VIDEO PROCESSING METHOD AND APPARATUS, AND DEVICE AND STORAGE MEDIUM

This application is a continuation application of International Application No. PCT/CN2021/131772, filed on Nov. 19, 2021, which claims priority to Chinese Patent Application No. 202011329694.5, titled "VIDEO PROCESSING METHOD AND APPARATUS, AND DEVICE AND STORAGE MEDIUM", filed with the China National Intellectual Property Administration on Nov. 24, 2020, both of which are incorporated herein by reference in their entireties.

FIELD

The present disclosure relates to the field of data processing, and in particular, to a video processing method and apparatus, a device and a storage medium.

BACKGROUND

With the continuous development of video processing technology, the functions of video processing are diversified increasingly. For example, video editing not only provides users with the function of adding sounds such as music and special effects, but also provides users with the function of adding stickers, text and the like to the video image, which enriches the user experience in video processing.

However, with the diversification of video processing functions, the interactive functions on the video processing interface are inclined to become complicated, which causes inconveniences for users to operate during the video processing process, affecting the user experience in video processing.

SUMMARY

In order to solve or at least partially solve the above technical problem, a video processing method and apparatus, a device, and a storage medium are provided according to the present disclosure, so as to redisplay an editing reference track by means of a mask layer when the editing reference track moves out of the video editing window, thereby reducing the impact on video processing of the user and improving the user experience.

In a first aspect, a video processing method is provided according to the present disclosure, the video processing method includes:
  displaying a mask layer at a bottom area of a video editing window on detecting that an editing reference track of a to-be-processed video moves out of the video editing window; where the editing reference track includes a video track and/or an audio track; and
  displaying, based on a timeline on the video editing window, the editing reference track of the to-be-processed video on the mask layer; wherein the editing reference track displayed on the mask layer is configured to assist a user to edit the to-be-processed video in the video editing window.

In a possible implementation, the video processing method further includes:
  hiding the mask layer and hiding the editing reference track displayed on the mask layer, on detecting that the editing reference track of the to-be-processed video moved out of the video editing window moves back into the video editing window.

In a possible implementation, the displaying, based on a timeline on the video editing window, the editing reference track of the to-be-processed video on the mask layer includes:
  displaying, based on the timeline on the video editing window, the audio track of the to-be-processed video on the mask layer in a preset manner.

In a possible implementation, before the displaying, based on the timeline on the video editing window, the audio track of the to-be-processed video in a preset manner on the mask layer, the video processing method further includes:
  determining a time point where target audio data is located in the audio track of the to-be-processed video; the target audio data comprises audio data of music type or audio data of sound effect type; and
  generating, based on the time point where the target audio data is located, a target audio visual line for the audio track of the to-be-processed video; where the target audio visual line is configured to visualize a playback position of the target audio data in the to-be-processed video;
  correspondingly, the displaying, based on the timeline on the video editing window, the audio track of the to-be-processed video in a preset manner on the mask layer comprises:
  displaying, based on the timeline on the video editing window, the target audio visual line on the mask layer.

In a possible implementation, the audio track of the to-be-processed video includes a first audio track and a second audio track, and the determining a time point where target audio data is located in the audio track of the to-be-processed video comprises:
  determining a time point where target audio data is located in the first audio track and a time point where target audio data is located in the second audio track respectively; and
  combining the time point where the target audio data is located in the first audio track and the time point where the target audio data is located in the second audio track to obtain a combined time point;
  correspondingly, the generating, based on the time point where the target audio data is located, a target audio visual line for the audio track of the to-be-processed video comprises:
  generating, based on the combined time point, the target audio visual line for the to-be-processed video.

In a possible implementation, the target audio data includes audio data of the music type; before the displaying, based on the timeline on the video editing window, the target audio visual line on the mask layer, the method further includes:
  marking a beat-tracking point on the target audio visual line.

In a possible implementation, the target audio data comprises audio data of sound effect type.

In a second aspect, a video processing apparatus is provided according to the present disclosure, the video processing apparatus includes:
  a first display module, configured to display a mask layer in a bottom area of a video editing window on detecting that an editing reference track of a to-be-processed video moves out of the video editing window; and
  a second display module, configured to display the editing reference track of the to-be-processed video on the mask layer based on a timeline on the video editing window; wherein the editing reference track includes a video track and/or an audio track, the editing reference track is configured to assist a user to edit the to-be-processed video in the video editing window.

In a third aspect, a computer readable storage medium is provided according to the present disclosure. The computer readable storage medium stores instructions, where the instructions, when executed by a terminal device, cause the terminal device to implement the above video processing method.

In a fourth aspect, a device is provided according to the present disclosure. The device includes a memory, a processor and a computer program stored in the memory and executable on the processor. When the computer program is executed by the processor, the processor implements the above video processing method.

Compared with the conventional technology, the technical solutions provided by embodiments of the present disclosure have the following advantages.

In the video processing method provided by the embodiments of the present disclosure, on detecting that an editing reference track of the to-be-processed video moves out of the video editing window, a mask layer is displayed at the bottom area of the video editing window, where the editing reference track includes the video track and/or audio track. Then, based on the timeline on the video editing window, the editing reference track of the to-be-processed video is displayed on the mask layer. The editing reference track displayed on the mask layer is used to assist the user to edit the to-be-processed video in the video editing window. It can be seen that the video processing method provided according to the embodiments of the present disclosure can redisplay the editing reference track by means of a mask layer when the editing reference track moves out of the video editing window, which can reduce the impact on the video processing of the user, thereby improving the user experience.

BRIEF DESCRIPTION OF THE DRAWINGS

The drawings are incorporated into the specification and constitute a part of the specification, which show embodiments complying with the present disclosure. The drawings and the specification are used as a whole to explain the principle of the present disclosure.

In order to more clearly illustrate the embodiments of the present disclosure or the technical solutions in the conventional art, the drawings used in the description of the embodiments or the conventional art are briefly introduced below. It is apparent that, for those skilled in the art, other drawings can be obtained according to the provided drawings without any creative effort.

DETAILED DESCRIPTION OF EMBODIMENTS

In order to understand the above purposes, features, and advantage of the present disclosure more clearly, the technical solutions according to the present disclosure will be further described. It should be noted that the embodiments of the present disclosure and the features in the embodiments may be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

With the diversification of video processing functions, the interactive functions on the video processing interface are inclined to become complicated, which causes inconveniences for users to operate during the video processing process, affecting the user experience in video processing.

In practical application scenarios, the video editing window can display more video editing functions through scrollbars. Nevertheless, scrolling based on scrollbars may cause the tracks (e.g., video tracks or audio tracks) used to assist users in video editing no longer be displayed in the video editing window, affecting the user experience in the video editing.

To this end, a video processing method is provided according to the present disclosure. In an embodiment, a mask layer is displayed at a bottom area of a video editing window, on detecting that an editing reference track of a to-be-processed video moves out of the video editing window. The editing reference track comprises a video track and/or an audio track. Then, the editing reference track of the to-be-processed video is displayed on the mask layer based on a timeline on the video editing window. The editing reference track displayed on the mask layer is configured to assist a user to edit the to-be-processed video in the video editing window.

It can be seen that in the video processing method provided according to the embodiments of the present disclosure, the editing reference track can be redisplayed by means of a mask layer when the editing reference track moves out of the video editing window, which can reduce the impact on the video processing of the user, thereby improving the user experience.

Figure 1:
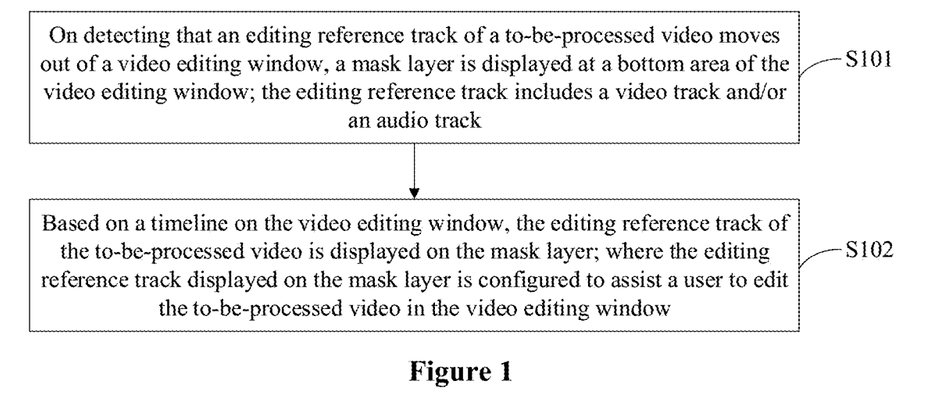
FIG. 1 is a flowchart of a video processing method according to an embodiment of the present disclosure.

Based on this, a video processing method is provided according to an embodiment of the present disclosure. Referring to FIG. 1, FIG. 1 is a flowchart of a video processing method according to an embodiment of the present disclosure, the video processing method includes steps S101 and S102 as follows.

In S101, on detecting that an editing reference track of a to-be-processed video moves out of a video editing window, a mask layer is displayed at a bottom area of the video editing window. The editing reference track includes a video track and/or an audio track.

The video processing method provided according to an embodiment of the present disclosure can be applied to functions such as video editing.

In practical applications, the video track and audio track play a certain auxiliary role in the video processing performed by the user. Hence, when the user is processing the to-be-processed video, the video track and audio track of the to-be-processed video should be displayed on the video editing window to enhance the user experience in video processing.

To this end, in the embodiments of the present disclosure, on detecting that the editing reference track of the to-be-processed video moves out of the video editing window, the editing reference track of the to-be-processed video moved out of the video editing window is displayed by means of a mask layer, so as to reduce the impact on the video processing of the user.

In a possible implementation, the user may need to scroll up and down the video editing window during video processing. When scrolling up and down, the editing reference track in the video editing window may move out of the video editing window, i.e., no longer appears in the video editing window. In order to reduce impact on the video processing of the user, in the embodiment of the present disclosure, a mask layer is displayed at the bottom area of the video editing window and the editing reference track is redisplayed on the mask layer.

The bottom area of the video editing window may be a display area determined based on the bottom boundary of the video editing window. The mask layer displayed in the bottom area has a certain degree of transparency, so as not to affect the content display and operation control in the underlying area covered by the mask layer while displaying the editing reference track on the mask layer. For example, the underlying area covered by the mask layer will update the display content as the video editing window is scrolled up and down.

In a possible implementation, on detecting that the video track of the to-be-processed video moves out of the video editing window, a mask layer is displayed at the bottom area of the video editing window. Alternatively, on detecting that the audio track of the to-be-processed video moves out of the video editing window, a mask layer is displayed at the bottom area of the video editing window. Or, on detecting that both the video track and audio track of the to-be-processed video move out of the video editing window, a mask layer is displayed at the bottom area of the video editing window. The video track may include a main video track, or the video track may include a main video track and a picture-in-picture track.

In S102, based on a timeline on the video editing window, the editing reference track of the to-be-processed video is displayed on the mask layer, where the editing reference track displayed on the mask layer is configured to assist a user to edit the to-be-processed video in the video editing window.

In the embodiment of the present disclosure, a timeline is displayed on the video editing window. Based on the timeline, the editing reference track of the to-be-processed video is displayed on the mask layer, so that the editing reference track displayed on the mask layer is consistent with the timeline displayed in the video editing window, which is convenient for the user to edit the to-be-processed video.

In a possible implementation, after the editing reference track is moved out of the video editing window, the editing reference track is always displayed on the mask layer at the bottom area of the video editing window, so as to facilitate the user to edit the video. On detecting that the editing reference track moved out of the video editing window moves back into the video editing window, the mask layer and the editing reference track displayed on the mask layer can be hidden to avoid redundant display of the editing reference track. At this point, the user can edit the to-be-processed video based on the editing reference track moved back into the video editing window.

In the video processing method provided by the embodiments of the present disclosure, on detecting that an editing reference track of the to-be-processed video moves out of the video editing window, a mask layer is displayed at the bottom area of the video editing window, where the editing reference track includes the video track and/or audio track. Then, based on the timeline on the video editing window, the editing reference track of the to-be-processed video is displayed on the mask layer. The editing reference track displayed on the mask layer is used to assist the user to edit the to-be-processed video in the video editing window. It can be seen that the video processing method provided according to the embodiments of the present disclosure can redisplay the editing reference track by means of a mask layer when the editing reference track moves out of the video editing window, which can reduce the impact on the video processing of the user, thereby improving the user experience.

In practical applications, in a case that the editing reference track includes an audio track, the audio track of the to-be-processed video can be displayed on the mask layer in a preset manner.

In a possible implementation, the audio track of the to-be-processed video can be displayed in the form of a visual line. For example, a time point where target audio data is located in the audio track of the to-be-processed video is determined. And a target audio visual line is then generated for the audio track of the to-be-processed video based on the time point where the target audio data is located. The target audio visual line is used to visualize a playback position of the target audio data in the to-be-processed video. In other words, through the target audio visual line, it can be determined where the target audio data is located in the to-be-processed video, for example, the playback position of the background music in the to-be-processed video can be determined.

Figure 2:
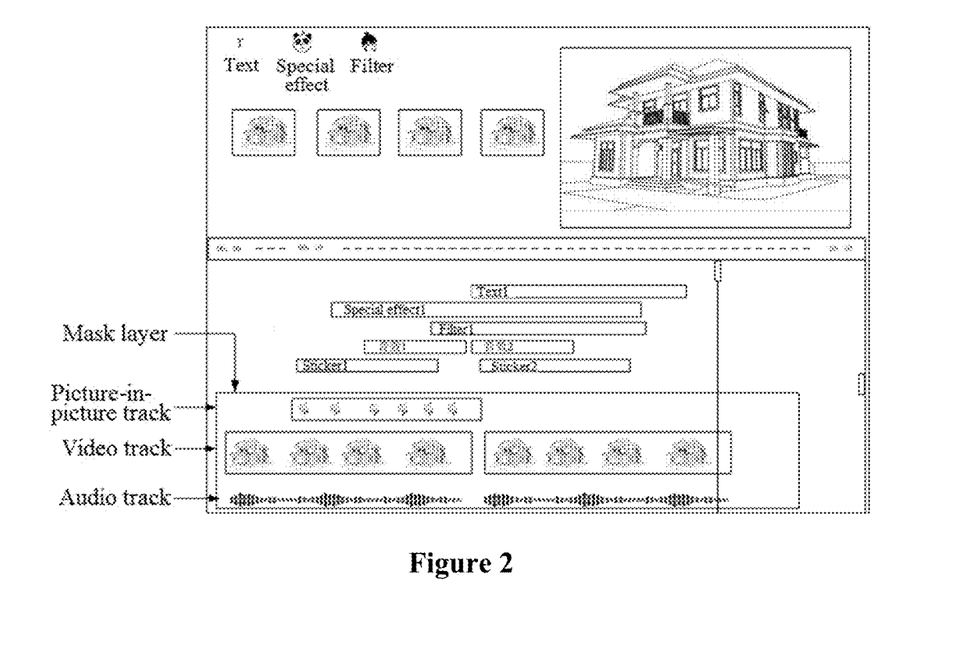
FIG. 2 is a schematic effect diagram of a video editing window according to an embodiment of the present disclosure.

As shown in FIG. 2, FIG. 2 is a schematic effect diagram of a video editing window according to an embodiment of the present disclosure. A mask layer is displayed at the bottom area of the video editing window, and a video track and a target audio visual line are simultaneously displayed on the mask layer. The target audio visual line may include at least one line segment, and the video track may include a main video track and a picture-in-picture track.

It is apparent that, in some implementations, only the video track may be displayed on the mask layer at the bottom area of the video editing window. Alternatively, only the target audio visual line may be displayed, which is not limited in this embodiment of the present disclosure.

In addition, the target audio data in the embodiments of the present disclosure may include audio data of music type, and/or audio data of sound effect type.

In an embodiment, the audio data of the music type is usually electronic music, such as songs, light music, etc. In the embodiment of the present disclosure, the determining a time point where target audio data is located in the audio track of the to-be-processed video can include: determining a time point where the audio data of the music type is located in the audio track of the to-be-processed video. The audio track can include at least one audio track of the music type.

The audio data of the sound effect type is usually special effect audio, dubbing, text reading and the like, such as the special effect audio "meow~" similar to cat meowing. In the embodiment of the present disclosure, the determining a time point where target audio data is located in the audio track of the to-be-processed video can include: determining a time point where the audio data of the sound effect type is located in the audio track of the to-be-processed video. The audio track can include at least one audio track of the sound effect type.

In a possible implementation, in a case that there is only one audio track including target audio data in the to-be-processed video, the time point where the target audio data is located in the audio track is determined as the time point where target audio data is located in the audio track of the to-be-processed video.

In another possible implementation, in a case that there are at least two audio tracks including the target audio data in the to-be-processed video, which are referred to as a first audio track and a second audio track in the following description as an example, then the determining a time point where target audio data is located in the audio track of the to-be-processed video can further include the following steps.

First, a time point where target audio data is located in the first audio track and a time point where target audio data is located in the second audio track are determined respectively. Then, the time point where target audio data is located in the first audio track and the time point where target audio data is located in the second audio track are combined to obtain a combined time point. Based on the combined time point, the target audio visual line for the to-be-processed video is generated.

Figure 3:
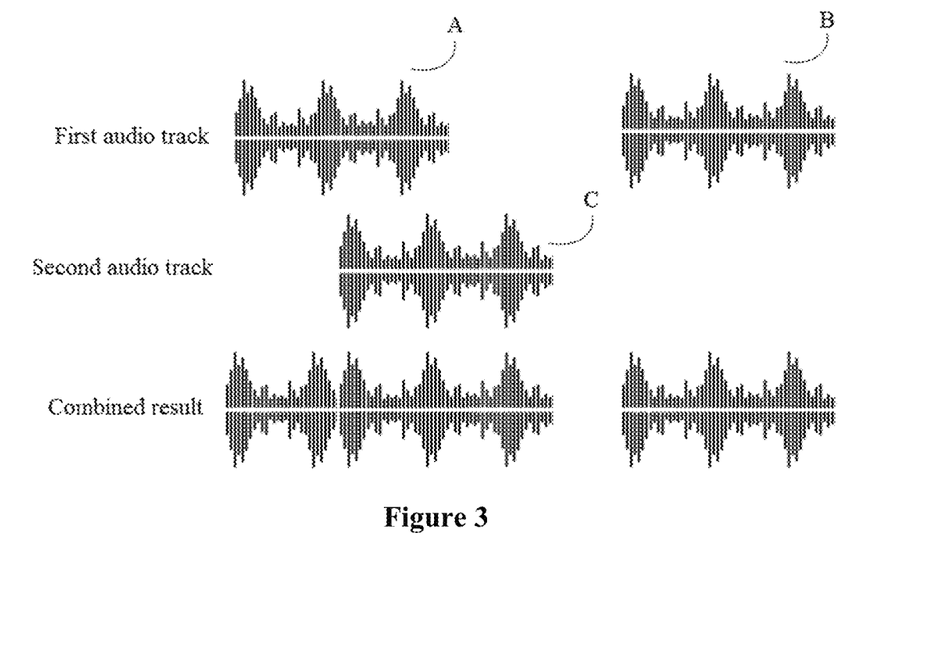
FIG. 3 is a schematic diagram showing that target audio data on multiple audio tracks are combined according to an embodiment of the present disclosure.

As shown in FIG. 3, FIG. 3 is a schematic diagram showing that time points of target audio data on multiple audio tracks are combined according to an embodiment of the present disclosure. The first audio track includes audio data A and audio data B, and the second audio track includes audio data C. Based on the timeline, the time points corresponding to audio data A, audio data B, and audio data C respectively are combined to obtain the combined time point, that is, the time point where the audio data A, audio data B, or audio data C is located. The time points corresponding to the audio data A, the audio data B and the audio data C are combined. In an embodiment, the time point where at least one of the audio data A, the audio data B and the audio data C is located in the to-be-processed video is reserved to form the target audio visual line.

In a possible implementation, the target audio data can include audio data of the music type and audio data of the sound effect type. Hence, in the embodiments of the present disclosure, visual line for the audio data of the music type and visual line for the audio data of the sound effect type can be generated separately. In an embodiment, based on the time point where the audio data of the music type is located in the audio track of the to-be-processed video, the music audio visual line is generated. At the same time, based on the time point where the audio data of the sound effect type is located in the audio track of the to-be-processed video, the sound effect audio visual line is generated.

Figure 4:
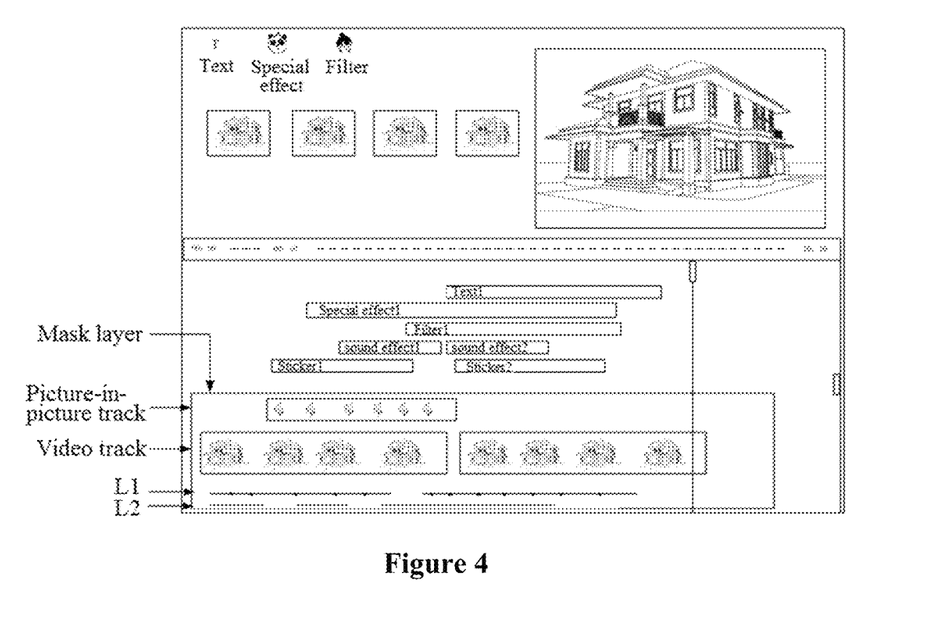
FIG. 4 is a schematic effect diagram of a video editing window according to another embodiment of the present disclosure.

FIG. 4 is a schematic effect diagram of a video editing window according to another embodiment of the present disclosure. On the mask layer of the video editing window, the main video track, the picture-in-picture track, the audio visual line L1 of the music type, and the audio visual line L2 of the sound effect type are displayed based on the same timeline.

In the video processing method provided according to the embodiments of the present disclosure, the time point where the target audio data is located in the audio track may be displayed for the user in the form of visual line, thereby optimizing the display effect of the video editing window without affecting the video processing, which is convenient for the user to operate, thereby improving the user experience.

In practical applications, in the process of video processing, the beat-tracking point is an important reference factor. Therefore, in the embodiment of the present disclosure, before displaying the target audio visual line on the mask layer based on the timeline on the video editing window, it is necessary to determine the beat-tracking points of the to-be-processed video, and then the beat-tracking points can be displayed to facilitate the video processing of the user and improve the user experience.

In an embodiment, in a case that the target audio data is audio data of the music type, the beat-tracking point is determined from the time point where the target audio data is located in the audio track of the to-be-processed video, and then the beat-tracking point is marked on the audio visual line of the music type.

The beat-tracking point is used to identify the rhythm, melody and the like of the music. The beat-tracking point can be automatically generated in advance or manually determined by the user, which is not limited here.

In a possible implementation, in a case that there is only one audio track including the audio data of the music type in the to-be-processed video, the beat-tracking point(s) on the audio track is determined as the beat-tracking point(s) of the to-be-processed video.

In another possible implementation, in a case that there are at least two audio tracks including the audio data of music type in the to-be-processed video, which are referred to as a third audio track and a fourth audio track in the following description as an example, then the beat-tracking points on the third audio track and the fourth audio track are superposed based on the timeline to determine the beat-tracking points in the to-be-processed video. As shown in FIG. 4, beat-tracking points are marked on the audio track of the music type.

In the video processing method provided by the embodiments of the present disclosure, not only the target audio visual line is displayed for the user on the mask layer, but also the beat-tracking point is displayed for the user, which can optimize the display effect of the video editing window without affecting the video processing, which is convenient for the user to operate, thereby improving the user experience.

Figure 5:
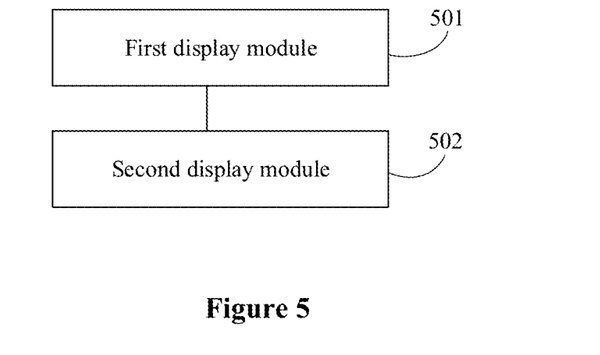
FIG. 5 is a schematic structural diagram of a video processing apparatus according to an embodiment of the present disclosure.

Based on the same inventive concept as the above method embodiment, a video processing apparatus is further provided according to the present disclosure. Referring to FIG. 5, FIG. 5 is a schematic structural diagram of a video processing apparatus according to another embodiment of the present disclosure. The video processing apparatus includes:

a first display module 501, configured to display a mask layer in a bottom area of a video editing window on detecting that an editing reference track of a to-be-processed video moves out of the video editing window; and a second display module 502, configured to display the editing reference track of the to-be-processed video on the mask layer based on a timeline on the video editing window; where the editing reference track includes a video track and/or an audio track, the editing reference track is configured to assist a user to edit the to-be-processed video in the video editing window.

In a possible implementation, the video processing apparatus further includes:

a hiding module, configured to hide the mask layer and hide the editing reference track displayed on the mask layer on detecting that the editing reference track of the to-be-processed video moved out of the video editing window moves back into the video editing window.

In a possible implementation, the second display module 502 is further configured to display the audio track of the to-be-processed video on the mask layer in a preset manner, based on the timeline on the video editing window.

In a possible implementation, the video processing apparatus further includes:

a first determination module, configured to determine a time point where target audio data is located in the audio track of the to-be-processed video; the target audio data includes audio data of music type or audio data of sound effect type;

a generation module, configured to generate a target audio visual line for the audio track of the to-be-processed video based on the time point where the target audio data is located; where the target audio visual line is configured to visualize a playback position of the target audio data in the to-be-processed video.

Correspondingly, the second display module 502 is further configured to display the target audio visual line on the mask layer based on the timeline on the video editing window.

In a possible implementation, the audio track of the to-be-processed video includes a first audio track and a second audio track, and the first determining module includes:

a first determination sub-module, configured to determine a time point where target audio data is located in the first audio track and a time point where target audio data is located in the second audio track respectively; and a combining sub-module, configured to combine the time point where the target audio data is located in the first audio track and the time point where the target audio data is located in the second audio track to obtain a combined time point.

Correspondingly, the generation module is further configured to generate the target audio visual line for the to-be-processed video based on the combined time point.

In a possible implementation, the target audio data includes audio data of music type; the video processing apparatus further includes:

a marking module, configured to mark a beat-tracking point on the target audio visual line.

In a possible implementation, the target audio data includes audio data of sound effect type.

In the video processing apparatus provided by the embodiments of the present disclosure, on detecting that an editing reference track of the to-be-processed video moves out of the video editing window, a mask layer is displayed at the bottom area of the video editing window, where the editing reference track includes the video track and/or audio track. Then, based on the timeline on the video editing window, the editing reference track of the to-be-processed video is displayed on the mask layer. The editing reference track displayed on the mask layer is used to assist the user to edit the to-be-processed video in the video editing window. It can be seen that the video processing apparatus provided according to the embodiments of the present disclosure can redisplay the editing reference track by means of a mask layer when the editing reference track moves out of the video editing window, which can reduce the impact on the video processing of the user, thereby improving the user experience.

In addition to the above methods and apparatuses, a computer readable storage medium is further provided according to an embodiment of the present disclosure. Instructions are stored in the computer readable storage medium. The instructions, when executed by a terminal device, cause the terminal device to implement the video processing methods described in the embodiments of the present disclosure.

Figure 6:
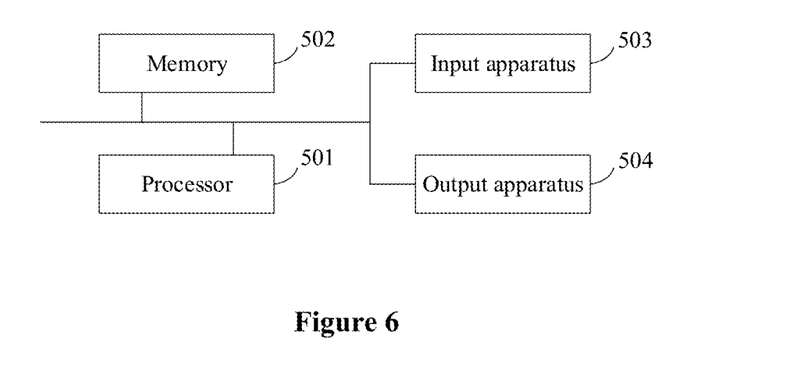
FIG. 6 is a schematic structural diagram of a video processing device according to an embodiment of the present disclosure.

In addition, a video processing device is further provided according to an embodiment of the present disclosure. Referring to FIG. 6, the video processing device may include: a processor 601, a memory 602, an input apparatus 603 and an output apparatus 604. The video processing device may include one or more processors 601. One processor is taken as an example in FIG. 6. In some embodiments of the present disclosure, the processor 601, the memory 602, the input apparatus 603 and the output apparatus 604 may be connected through a bus or in other manner. In FIG. 6, a connection through the bus is taken as an example.

The memory 602 may be configured to store a software program and modules. The processor 601 runs the software program and modules stored in the memory 602, to perform various functional applications and data processing of the video processing device. The memory 602 may mainly include a program memory area and a data memory area. An operating system, an application required by at least one function and the like are stored in the program memory area. In addition, the memory 602 may include a high-speed random access memory, or may include a non-volatile memory, such as at least one disk storage device, a flash device or other volatile solid-state storage device. The input apparatus 603 may be configured to receive inputted number or character information, and generate a signal related to user settings and function control of the video processing device.

In the embodiment, the processor 601 may load an executable file corresponding to the processes of one or more application programs into the memory 602 in response to an instruction, and the processor 601 runs the application programs stored in the memory 602, thereby realizing various functions in the above video processing device.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

The above are only specific implementations of the present disclosure, to enable those skilled in the art to understand or implement the present disclosure. It is obvious for those skilled in the art to make many modifications to these embodiments. The general principle defined herein may be applied to other embodiments without departing from the scope of the present disclosure. Therefore, the present disclosure is not limited to the embodiments illustrated herein, but should be defined by the broadest scope consistent with the principle and novel features disclosed herein.

The invention claimed is:

1. A video processing method, comprising:
    displaying a mask layer at a bottom area of a video editing window on detecting that an editing reference track of a to-be-processed video moves out of the video editing window, wherein the editing reference track comprises a video track and/or an audio track; and
    displaying, based on a timeline on the video editing window, the editing reference track of the to-be-processed video on the mask layer; wherein the editing reference track displayed on the mask layer is configured to assist a user to edit the to-be-processed video in the video editing window.

2. The method according to claim 1, further comprising:
    hiding the mask layer and hiding the editing reference track displayed on the mask layer, on detecting that the editing reference track of the to-be-processed video moved out of the video editing window moves back into the video editing window.

3. The method according to claim 1, wherein the displaying, based on the timeline on the video editing window, the editing reference track of the to-be-processed video on the mask layer comprises:
    displaying, based on the timeline on the video editing window, the audio track of the to-be-processed video on the mask layer in a preset manner.

4. The method according to claim 3, wherein before the displaying, based on the timeline on the video editing window, the audio track of the to-be-processed video in the preset manner on the mask layer, the method further comprises:
    determining a time point where target audio data is located in the audio track of the to-be-processed video; wherein the target audio data comprises audio data of music type or audio data of sound effect type; and
    generating, based on the time point where the target audio data is located, a target audio visual line for the audio track of the to-be-processed video; wherein the target audio visual line is configured to visualize a playback position of the target audio data in the to-be-processed video;
    wherein the displaying, based on the timeline on the video editing window, the audio track of the to-be-processed video in the preset manner on the mask layer comprises:
        displaying, based on the timeline on the video editing window, the target audio visual line on the mask layer.

5. The method according to claim 4, wherein the audio track of the to-be-processed video comprises a first audio track and a second audio track, and the determining the time point where target audio data is located in the audio track of the to-be-processed video comprises:
    determining a time point where target audio data is located in the first audio track and a time point where target audio data is located in the second audio track respectively; and
    combining the time point where the target audio data is located in the first audio track and the time point where the target audio data is located in the second audio track to obtain a combined time point;
    wherein the generating, based on the time point where the target audio data is located, the target audio visual line for the audio track of the to-be-processed video comprises:
        generating, based on the combined time point, the target audio visual line for the to-be-processed video.

6. The method according to claim 4, wherein the target audio data comprises audio data of music type; before the displaying, based on the timeline on the video editing window, the target audio visual line on the mask layer, the method further comprises:
    marking a beat-tracking point on the target audio visual line.

7. The method according to claim 5, wherein the target audio data comprises audio data of music type; before the displaying, based on the timeline on the video editing window, the target audio visual line on the mask layer, the method further comprises:
    marking a beat-tracking point on the target audio visual line.

8. The method according to claim 4, wherein the target audio data comprises audio data of sound effect type.

9. The method according to claim 5, wherein the target audio data comprises audio data of sound effect type.

10. A non-transitory computer readable storage medium having instructions stored thereon, wherein the instructions, when executed by a terminal device, cause the terminal device to implement:
    displaying a mask layer at a bottom area of a video editing window on detecting that an editing reference track of a to-be-processed video moves out of the video editing window, wherein the editing reference track comprises a video track and/or an audio track; and
    displaying, based on a timeline on the video editing window, the editing reference track of the to-be-processed video on the mask layer; wherein the editing reference track displayed on the mask layer is configured to assist a user to edit the to-be-processed video in the video editing window.

11. The storage medium according to claim 10, wherein the instructions further cause the terminal device to implement:
    hiding the mask layer and hiding the editing reference track displayed on the mask layer, on detecting that the editing reference track of the to-be-processed video moved out of the video editing window moves back into the video editing window.

12. A device, comprising:
    a memory;
    a processor; and
    a computer program stored in the memory and executable on the processor,
    wherein the processor, when executing the computer program, implements:
    displaying a mask layer at a bottom area of a video editing window on detecting that an editing reference track of a to-be-processed video moves out of the video editing window, wherein the editing reference track comprises a video track and/or an audio track; and
    displaying, based on a timeline on the video editing window, the editing reference track of the to-be-processed video on the mask layer; wherein the editing reference track displayed on the mask layer is configured to assist a user to edit the to-be-processed video in the video editing window.

13. The device according to claim 12, wherein the processor further implements:
    hiding the mask layer and hiding the editing reference track displayed on the mask layer, on detecting that the editing reference track of the to-be-processed video moved out of the video editing window moves back into the video editing window.

14. The device according to claim 12, wherein the processor further implements:

displaying, based on the timeline on the video editing window, the audio track of the to-be-processed video on the mask layer in a preset manner.

15. The device according to claim 14, wherein the processor further implements:

determining a time point where target audio data is located in the audio track of the to-be-processed video; wherein the target audio data comprises audio data of music type or audio data of sound effect type;

generating, based on the time point where the target audio data is located, a target audio visual line for the audio track of the to-be-processed video; wherein the target audio visual line is configured to visualize a playback position of the target audio data in the to-be-processed video; and displaying, based on the timeline on the video editing window, the target audio visual line on the mask layer.

16. The device according to claim 15, wherein the audio track of the to-be-processed video comprises a first audio track and a second audio track, and the processor further implements:

determining a time point where target audio data is located in the first audio track and a time point where target audio data is located in the second audio track respectively;

combining the time point where the target audio data is located in the first audio track and the time point where the target audio data is located in the second audio track to obtain a combined time point; and generating, based on the combined time point, the target audio visual line for the to-be-processed video.

17. The device according to claim 15, wherein the target audio data comprises audio data of music type, and the processor further implements:

marking a beat-tracking point on the target audio visual line.

18. The device according to claim 16, wherein the target audio data comprises audio data of music type, and the processor further implements:

marking a beat-tracking point on the target audio visual line.

19. The device according to claim 15, wherein the target audio data comprises audio data of sound effect type.

20. The device according to claim 16, wherein the target audio data comprises audio data of sound effect type.

* * * * *